United States Patent
Ohtani et al.

(10) Patent No.: US 9,647,278 B2
(45) Date of Patent: May 9, 2017

(54) METAL SEPARATOR FOR FUEL CELLS AND MANUFACTURING METHOD THEREOF

(71) Applicant: HONDA MOTOR CO., LTD., Minato-ku, Tokyo (JP)

(72) Inventors: Teruyuki Ohtani, Saitama (JP); Masao Utsunomiya, Saitama (JP); Natsuki Anzai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 451 days.

(21) Appl. No.: 13/852,582

(22) Filed: Mar. 28, 2013

(65) Prior Publication Data

US 2013/0288161 A1    Oct. 31, 2013

(30) Foreign Application Priority Data

Mar. 30, 2012 (JP) ................. 2012-080413
Jan. 16, 2013 (JP) ................. 2013-005209

(51) Int. Cl.
*H01M 8/02* (2016.01)
*H01M 8/0245* (2016.01)
(Continued)

(52) U.S. Cl.
CPC ....... *H01M 8/0245* (2013.01); *H01M 8/0206* (2013.01); *H01M 8/0228* (2013.01); *H01M 2008/1095* (2013.01); *Y02P 70/56* (2015.11)

(58) Field of Classification Search
CPC ................................................ H01M 8/0245
See application file for complete search history.

(56) References Cited

U.S. PATENT DOCUMENTS 7,794,863 B2    9/2010  Horiguchi
8,338,058 B2   12/2012  Kikui
(Continued)

FOREIGN PATENT DOCUMENTS

CN          1665058 A       9/2005
DE   10 2007 005232 A1     7/2008
(Continued)

OTHER PUBLICATIONS

First Office Action mailed Dec. 3, 2014 issued in the corresponding Chinese Patent Application No. 201310103836.X.
(Continued)

*Primary Examiner* — Scott J Chmielecki
(74) *Attorney, Agent, or Firm* — Carrier Blackman & Associates, P.C.; William D. Blackman; Joseph P. Carrier

(57) ABSTRACT

To provide a metal separator for fuel cells that can equalize the wet environment of a membrane electrode assembly and a manufacturing method thereof. A metal separator for fuel cells and a manufacturing method thereof are characterized in that, a first separator (14) made of metal, which is layered in a membrane electrode assembly (12) to which a pair of electrodes is provided on both sides of a solid polymer electrolyte membrane (120), is formed into a corrugated sheet shape having convex parts and concaved parts, a noble metal thin film (147) is formed on a convex part (145) of the first separator (14), and holes (148) through which the first separator (14) is exposed are formed in the noble metal thin film (147).

20 Claims, 13 Drawing Sheets

(51) Int. Cl.
*H01M 8/0206* (2016.01)
*H01M 8/0228* (2016.01)
*H01M 8/1018* (2016.01)

(56) References Cited

U.S. PATENT DOCUMENTS

| | | | |
|---|---|---|---|
| 2003/0068523 A1* | 4/2003 | Kaneta | B32B 15/018 428/670 |
| 2004/0081879 A1 | 4/2004 | Washima et al. | |
| 2007/0138133 A1* | 6/2007 | Cha | H01M 4/8803 216/56 |
| 2008/0038617 A1* | 2/2008 | McLean | H01M 8/04201 429/421 |
| 2008/0038619 A1 | 2/2008 | Takagi et al. | |
| 2009/0042084 A1* | 2/2009 | Kobayashi | C23C 18/42 429/484 |
| 2009/0191351 A1 | 7/2009 | Owejan et al. | |
| 2010/0098983 A1 | 4/2010 | Goto et al. | |
| 2010/0104912 A1* | 4/2010 | Ogawa | H01M 8/0245 429/435 |
| 2010/0239960 A1 | 9/2010 | Ishigami et al. | |
| 2010/0260928 A1* | 10/2010 | Hasegawa | H01M 8/0206 427/115 |
| 2011/0165501 A1 | 7/2011 | Maeda et al. | |

FOREIGN PATENT DOCUMENTS

| | | |
|---|---|---|
| DE | 10 2009 005766 A1 | 8/2009 |
| DE | 11 2008 002184 T5 | 8/2010 |
| DE | 10 2010 003171 A1 | 12/2010 |
| EP | 1848054 A1 | 10/2007 |
| JP | 2003105523 A | 4/2003 |
| JP | 2004-158437 A | 6/2004 |
| JP | 2007-141819 A | 6/2007 |
| JP | 2008066282 A | 3/2008 |
| JP | 2009-123352 A | 6/2009 |
| JP | 2010-027262 A | 2/2010 |
| JP | 2010-225360 A | 10/2010 |
| WO | 2010/007918 A1 | 1/2010 |

OTHER PUBLICATIONS

Search Report issued to DE Application 102013205718.0, mailed Oct. 24, 2013.
Office Action, Decision of Refusal, issued in the corresponding Japanese Patent Application 2013-005209, dated Feb. 7, 2017.

* cited by examiner

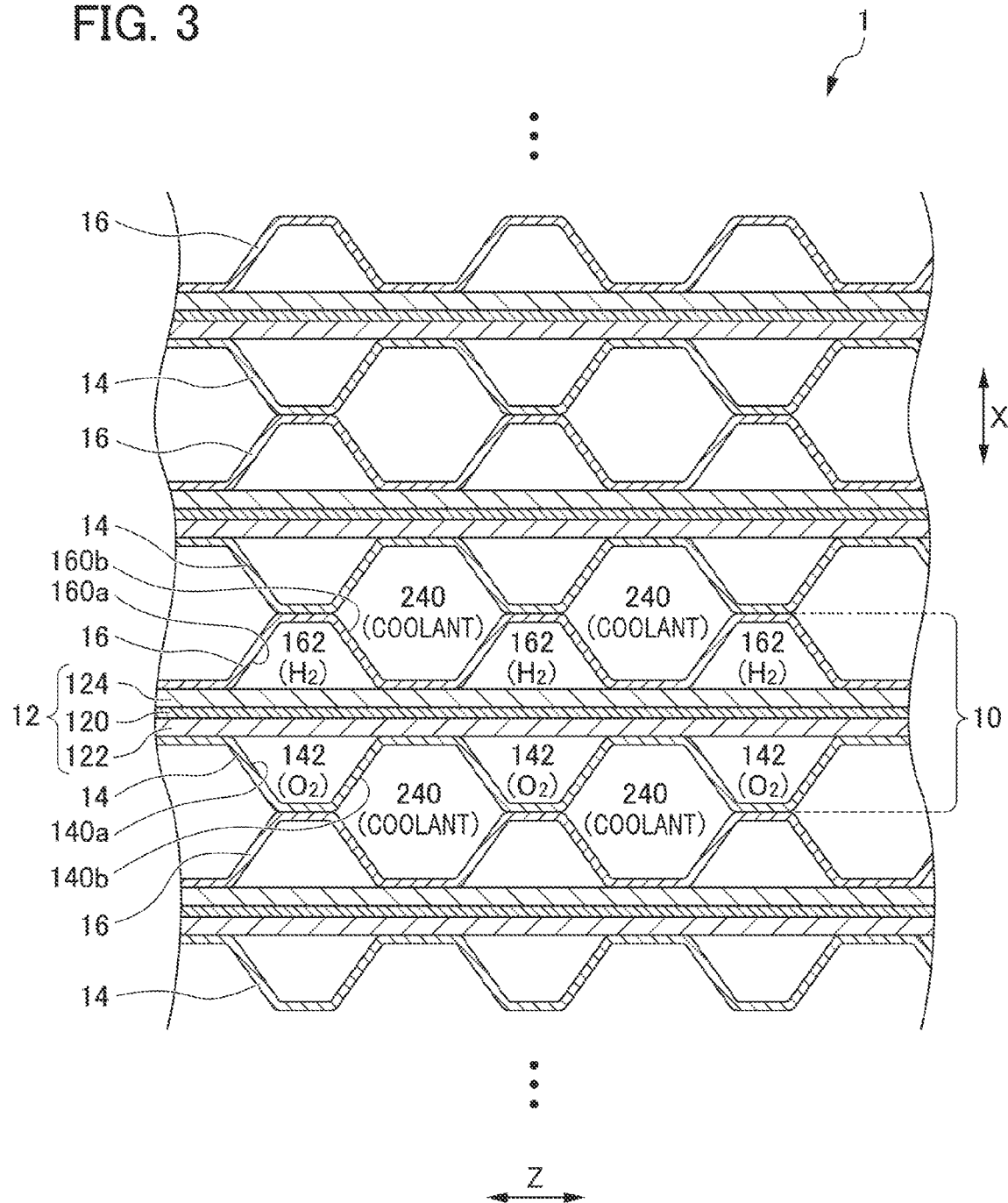

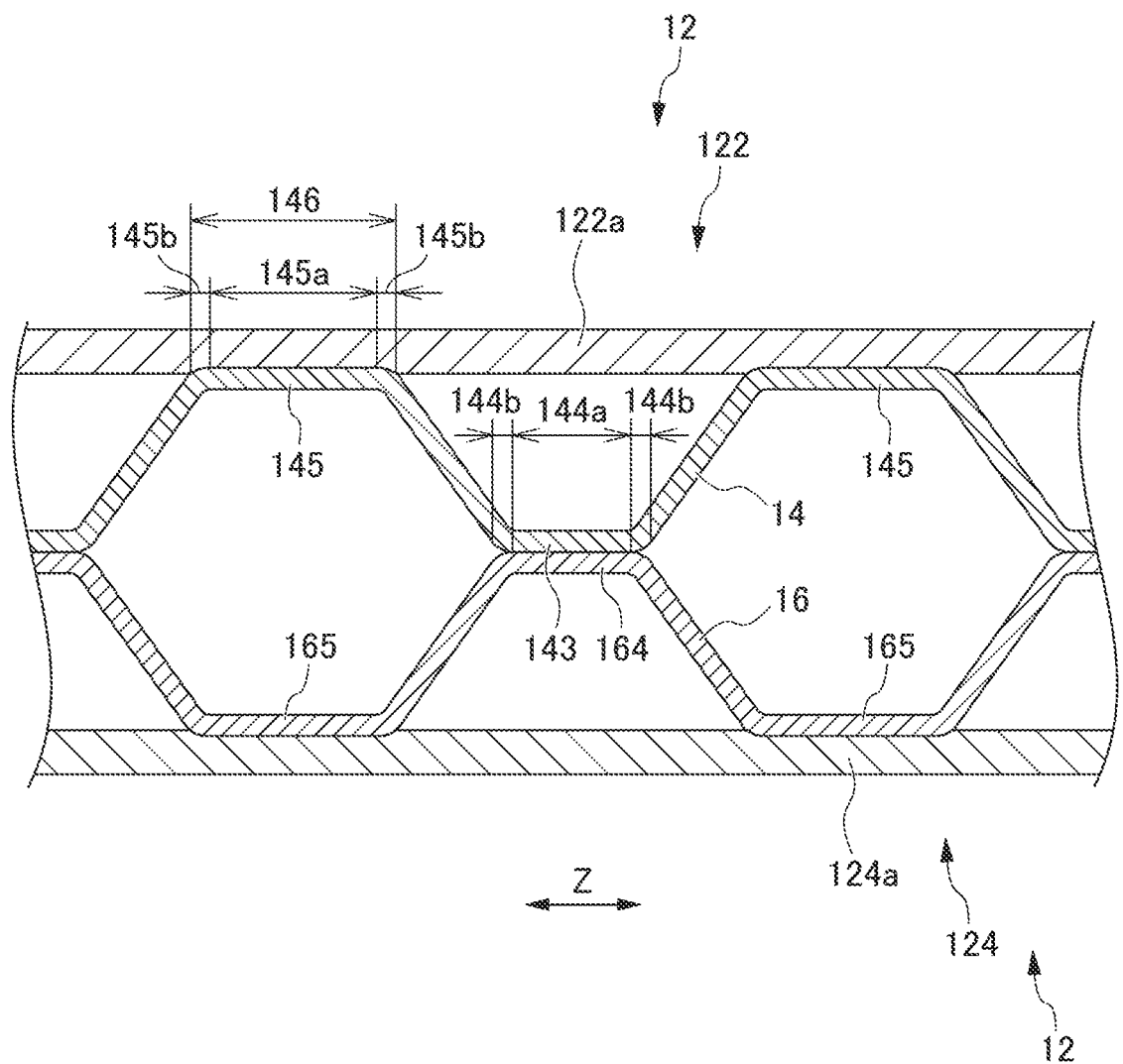

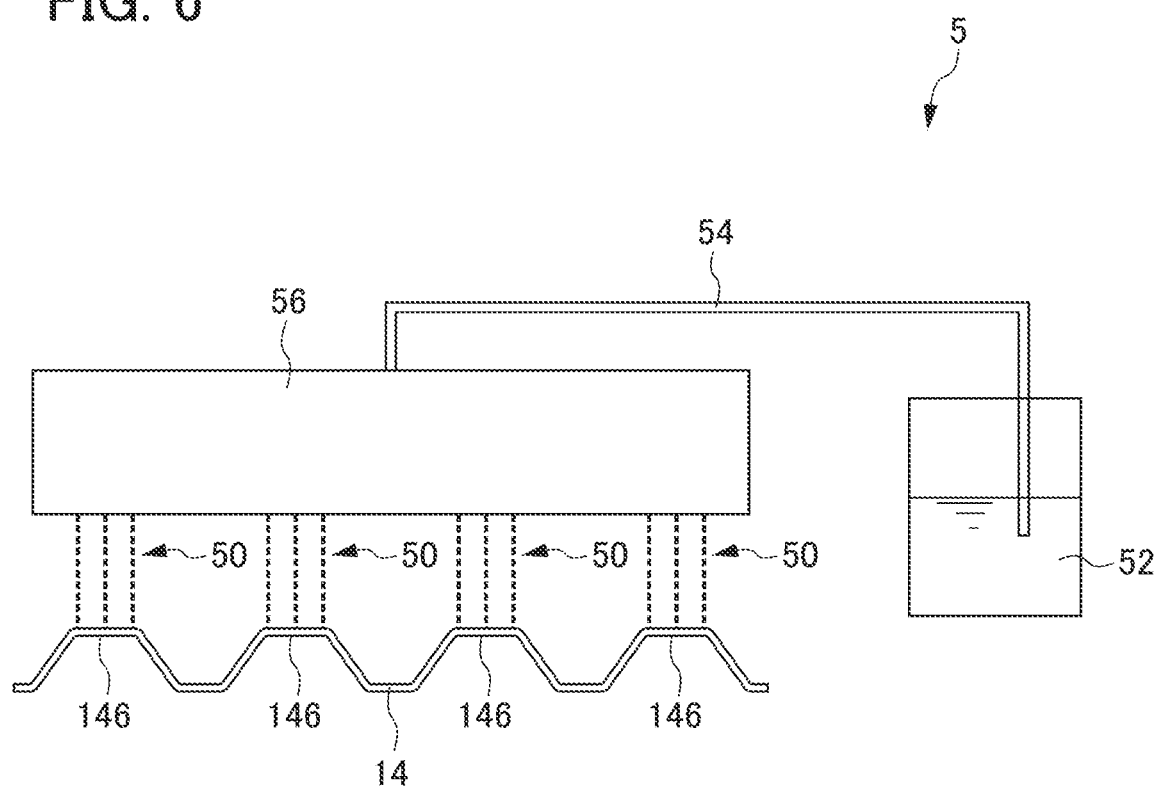

150

151

152

METAL SEPARATOR FOR FUEL CELLS AND MANUFACTURING METHOD THEREOF

This application is based on and claims the benefit of priority from Japanese Patent Application No. 2012-080413, filed on 30 Mar. 2012, and Japanese Patent Application No. 2013-005209, filed on 16 Jan. 2013, the content of which is incorporated herein by reference.

BACKGROUND OF THE INVENTION

Field of the Invention

The present invention relates to a metal separator for fuel cells and a manufacturing method thereof. In detail, it relates to a metal separator for fuel cells on which a surface treatment had been conducted, and a manufacturing method thereof.

Related Art

In recent years, fuel cells that generate electric power by allowing reactant gases to undergo an electrochemical reaction have received attention as a novel source of power for automobiles or the like. Fuel cells are said to be preferable in the aspect of the electric power generation efficiency being high due to directly obtaining electricity by way of an electrochemical reaction. In addition, fuel cells are said to be preferable also from the aspect of the impact on the environment due to only producing harmless water during electric power generation.

For example, solid polymer-type fuel cells have a stack structure in which several tens to several hundreds of cells are layered. Each cell is configured by sandwiching a membrane electrode assembly (MEA) with a pair of separators. The membrane electrode assembly is configured by an anode and cathode as well as an electrolyte membrane sandwiched between these electrodes, and both electrodes include a catalyst layer that contacts the electrolyte membrane, and a gas diffusion layer that contacts the catalyst layer. In addition, fuel gas channels are formed in the separator on one surface thereof, and oxidant gas channels are formed on the other surface.

With the solid polymer-type fuel cell provided with the above such configuration, hydrogen is supplied as fuel gas through the fuel gas channels to the anode. In addition, air is supplied as oxidant gas through the oxidant gas channels to the cathode. Then, the hydrogen supplied to the anode is protonated on the catalyst layer, and the yield protons migrate through the electrolyte membrane to the cathode. At this time, electrons yielded along with protons are drawn to an external circuit and employed as electrical energy.

However, metal separators made of stainless steel or the like are usually employed as the above-mentioned separators. Various surface treatments have be known to be conducted on this metal separator such as conducting a water-repellent treatment with the purpose to suppressing the occurrence of flooding, and a plating process with the purpose of suppressing oxidation to suppress an increase in the contact resistance with the membrane electrode assembly. For example, a technology has been disclosed in which, after forming a resin layer on the surface of the metal separator, a water-repellent layer is formed in an island form on this resin layer (refer to Patent Document 1).

[Patent Document 1] Japanese Unexamined Patent Application, Publication No. 2007-141819

SUMMARY OF THE INVENTION

However, in order to exhibit high electric power generation performance, an equalized wet environment is required in a membrane electrode assembly. For this reason, it is necessary to make the wet condition of the entire surface of the electric power generating surface of the electrolyte membrane to be uniform so that the moisture content inside of the electrolyte membrane is equalized (made uniform) to generate electric power uniformly over the entire surface of the electric power generating surface of the electrolyte membrane.

However, with the technology of Patent Document 1, a water-repellent layer is provided to grooves constituting each channel for suppressing flooding, and a hydrophilic resin layer is only provided merely at the contact area with the membrane electrode assembly. For this reason, with the technology of Patent Document 1, reaction product water distributes unevenly at the interface between the membrane electrode assembly and the separator, and thus the wet environment of the membrane electrode assembly cannot be equalized.

The present invention has been made taking the above into account, and an object thereof is to provide a metal separator for fuel cells that can equalize the wet environment of the membrane electrode assembly, and a manufacturing method thereof.

In order to achieve the above-mentioned object, the present invention is characterized by a metal separator for fuel cells (e.g., the first separator 14, 14A, 14B, 14C, 14D, 14E, 14E, second separator 16 described later) that is layered on a membrane electrode assembly (e.g., the membrane electrode assembly 12 described later) to which a pair of electrodes (e.g., the cathode 122 and anode 124 described later) is provided on both sides of an electrolyte membrane (e.g., the solid polymer electrolyte membrane 120 described later), in which the metal separator for fuel cells is formed in a corrugated sheet shape having a convex part and a concaved part, a noble metal thin film (e.g., the noble metal thin film 147, 147A, 147B, 147C, 147D, 147E, 147F described later) is formed on the convex part (e.g., the convex part 145, 145A, 145B, 145C, 145D, 145E, 145F described later) of the metal separator for fuel cells, and holes (e.g., the hole 148, 148A, 148B, 148C, 148D, 148E, 148F described later) through which the metal separator for fuel cells is exposed are formed in the noble metal thin film.

In the present invention, the metal separator for fuel cells is formed into a corrugated sheet shape having convex parts and concaved parts, and a noble metal thin film is formed on the surface of the convex parts thereof. In addition, in the present invention, holes through which the metal separator for fuel cells is exposed are formed in the noble metal thin film.

Herein, the noble metal thin film has a characteristic of not easily generating oxides, and having water-repellency. On the other hand, the holes have a characteristic of oxides tending to be produced on the surface of the separator and having hydrophilicity. For this reason, the reaction product water produced by the reaction at the membrane electrode assembly and flowing into the interface with the separator smoothly pours into the holes and is maintained therein. The wet environment of the membrane electrode assembly can thereby be equalized since the reaction product water is uniformly maintained at the interface between the membrane electrode assembly and the separator without distributing unevenly.

In addition, during high-load operation, for example, since an abundance of reaction product water is generated, the reaction product water amount pouring into the holes exceeds the capacity of the holes. Then, the reaction product water starts to overflow from the holes and smoothly flows over the water-repellent noble metal thin film, and flows out to the respective adjacent channels. Even during high-load operation, the reaction product water does not unevenly distribute at the interface between the membrane electrode assembly and the separator, whereby the equalized wet environment of the membrane electrode assembly is maintained.

In contrast, during low-load operation, for example, since only a small amount of reaction product water is produced, the reaction product water being retained in the holes during high-load operation is supplied to the membrane electrode assembly side. A change in the wet environment of the membrane electrode assembly is thereby suppressed even during low-load operation, and thus the equalized wet environment is maintained.

Therefore, according to the present invention, the wet environment of the membrane electrode assembly can be equalized irrespective of the operation state of the fuel cell.

Furthermore, contact resistance between metal separators for fuel cells can be suppressed by the noble metal thin film formed with holes exposing the metal separator for fuel cells being formed on the convex parts of the metal separators for fuel cells at the surface of the convex parts at which the metal separators for fuel cells contact.

In this case, it is preferable for the holes to be regularly formed in the surface of the convex part.

In the present invention, the holes are formed regularly in the surface of the contact area. The wet environment of the membrane electrode assembly can thereby be further equalized since the reaction product water is more uniformly retained without unevenly distributing at the interface between the membrane electrode assembly and the separator. In addition, the wet environment of the membrane electrode assembly can be further equalized irrespective of the operation state of the fuel cell.

In this case, it is preferable for the holes to be formed by being surrounded with the noble metal thin film formed by dot-shaped ink containing noble metal connecting with each other.

In the present invention, the holes are formed by being surrounded with the noble metal thin film formed by dot-shaped ink containing noble metal connecting with each other. It is thereby possible to easily obtain a metal separator for fuel cells on which a grid-shaped noble metal thin film is formed on the surface.

In addition, a method of manufacturing a metal separator for fuel cells (e.g., the first separator 14, 14A, 14B, 14C, 14D, 14E, 14F, second separator 16 described later) that is layered on a membrane electrode assembly (e.g., the membrane electrode assembly 12 described later) to which a pair of electrodes (e.g., the cathode 122 and anode 124 described later) is provided on both sides of an electrolyte membrane (e.g., the solid polymer electrolyte membrane 120 described later) is provided, the method including: a noble metal thin film formation step of forming a noble metal thin film (e.g., the noble metal thin film 147, 147A, 147B, 147C, 147D, 147E, 147F described later) on a convex part (e.g., the convex part 145, 145A, 145B, 145C, 145D, 145E, 145F described later) of a thin sheet made of metal that has been formed into a corrugated sheet shape having convex parts and concaved parts, in which the noble metal thin film is formed in the noble metal thin film formation step so that holes (e.g., the hole 148, 148A, 148B, 148C, 148D, 148E, 148F described later) through which the metal separator for fuel cells is exposed are formed in the noble metal thin film.

In this case, it is preferable for the noble metal thin film to be formed in the noble metal thin film formation step by way of an ink-jet printing method.

The same effects as the invention of the aforementioned metal separator for fuel cells are exerted according to the method of manufacturing a metal separator for fuel cells according to the present invention. In particular, by adopting an ink-jet printing method, it is possible to manufacture a metal separator for fuel cells in which a grid-shaped noble metal thin film is formed on a surface by way of a low cost, simple operation.

According to the present invention, it is possible to provide a metal separator for fuel cells that can equalize the wet environment of the membrane electrode assembly, and a manufacturing method thereof.

BRIEF DESCRIPTION OF THE DRAWINGS

FIG. 3 is a longitudinal section of a fuel cell stack according to the embodiment;

FIG. 4 is a cross-sectional view of a first separator according to the embodiment;

FIG. 6 is a view showing a noble metal thin film formation step according to an ink-jet printing method;

DETAILED DESCRIPTION OF THE INVENTION

Hereinafter, an embodiment of the present invention will be explained while referencing the drawings.

Figure 1:
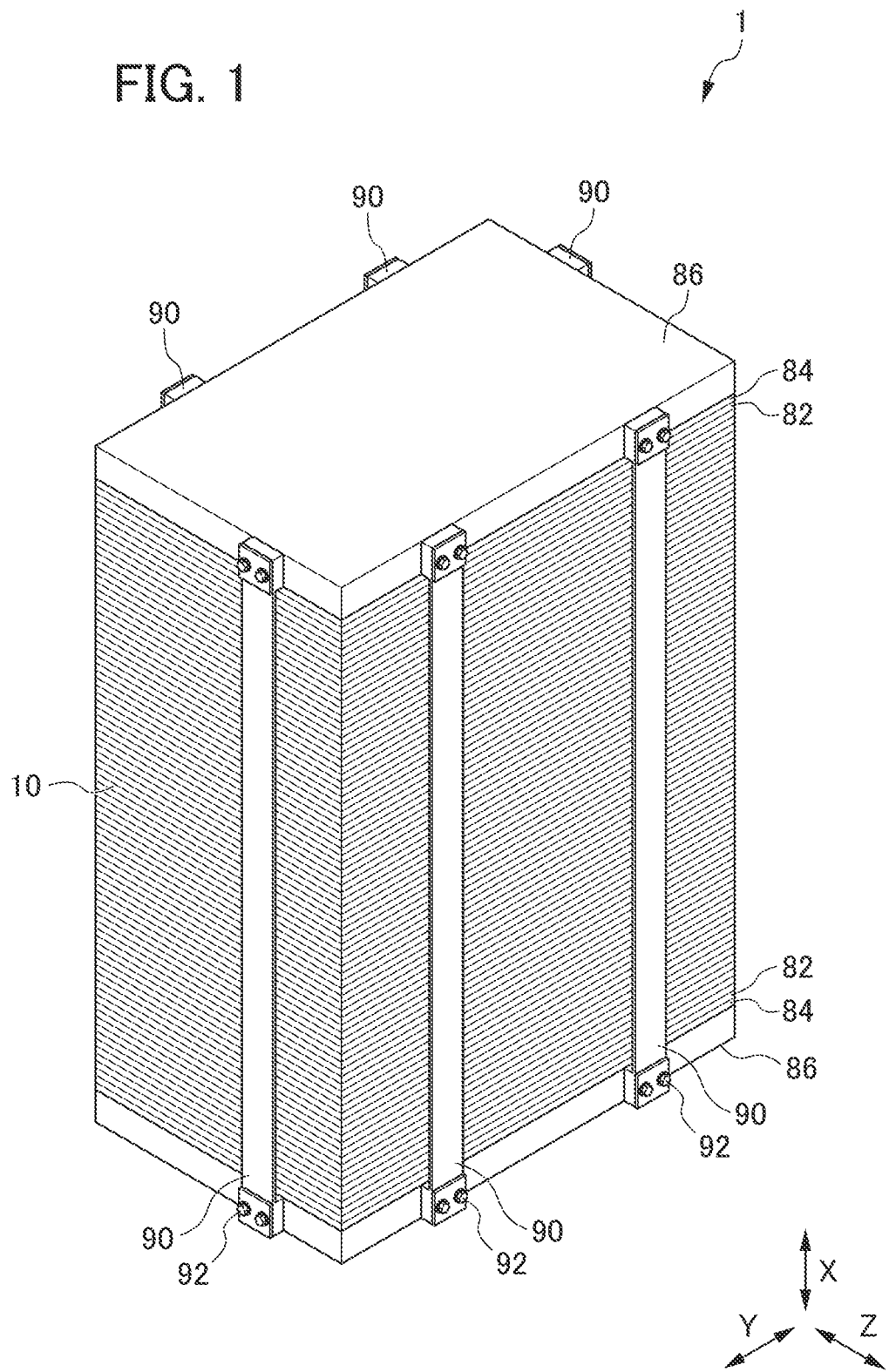
FIG. 1 is a perspective view showing the configuration of a fuel cell stack according to an embodiment of the present invention.

FIG. 1 is a perspective view showing the configuration of a fuel cell stack 1 according to the embodiment of the present invention. The fuel cell stack 1 is a fuel cell stack provided with a metal separator for fuel separators according to the present invention. As shown in FIG. 1, the fuel cell stack 1 includes a plurality of power generation cells 10 layered in a vertical direction, with the electrode surfaces horizontal.

Terminal plates 82, 82, insulating plates 84, 84 and end plates 86, 86 are respectively fixedly set up on the top end and bottom end of the fuel cell stack 1. Between the end plates 86, 86, both ends of a plurality of connection bars 90 are fixed through bolts 92 in a state in which a predetermined tightening load is applied. An increase in the contact resistance is thereby suppressed by a predetermined contact pressure being applied to the electrode surfaces of the power generation cell 10.

Figure 2:
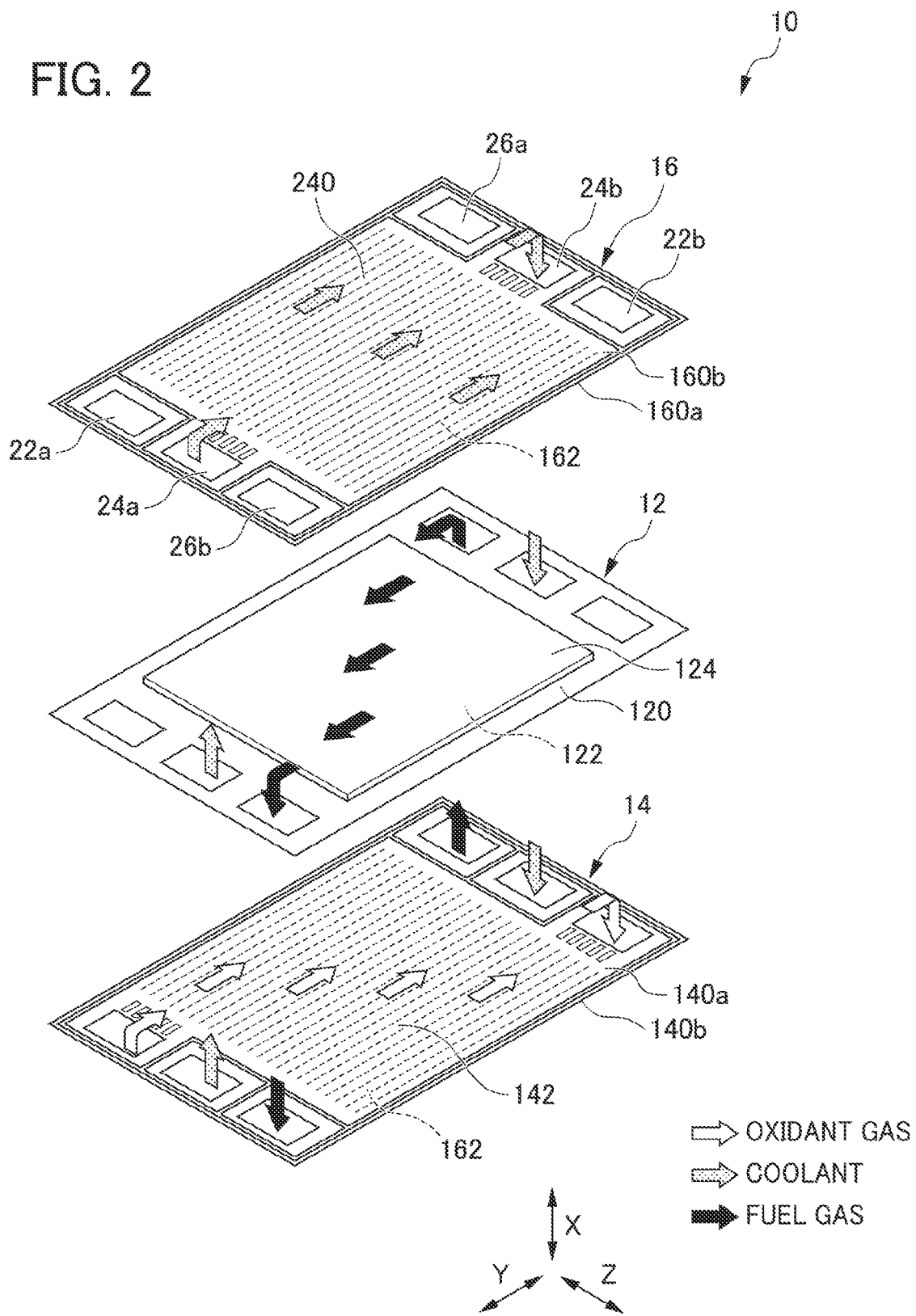
FIG. 2 is an exploded perspective view of a power generation cell according to the embodiment.

FIG. 2 is an exploded perspective view of the power generation cell 10 according to the present embodiment. In addition, FIG. 3 is a longitudinal section of the fuel cell stack 1 according to the present embodiment.

As shown in FIGS. 2 and 3, the power generation cell 10 includes a membrane electrode assembly 12, and a first separator 14 and second separator 16 as a pair of metal separators for fuel cells sandwiching the member electrode structure 12.

An oxidant gas inlet passage 22a, a coolant inlet passage 24a and a fuel gas outlet passage 26b, which respectively communicate in the thickness direction of the power generation cell 10 (X direction in FIG. 2) are provided at one end side in the longitudinal direction (Y direction in FIG. 2) of the power generation cell 10. In addition, a fuel gas inlet passage 26a, a coolant outlet passage 24b and an oxidant gas outlet passage 22b, which respectively communicate in the X direction of the power generation cell 10, are provided at the other end side in the Y direction of the power generation cell 10.

The first separator 14 and second separator 16 are configured from metal plates such as steel plates, stainless-steel plates, and aluminum plates, for example.

In addition, as shown in FIG. 2, a sealing member that surrounds the outer-circumferential edge of the first separator 14 is integrally molded at surfaces 140a and 140b of the first separator. Similarly, a sealing member that surrounds the outer-circumferential edge of the second separator 16 is integrally molded at surfaces 160a and 160b of the second separator 16. For example, a sealing member having elasticity such as a seal material, cushion material and packing material such as EPDM (ethylene propylene diene rubber), NBR (nitrile butadiene rubber), fluorine rubber, silicone rubber, fluorosilicone rubber, butyl rubber, natural rubber, styrene rubber, chloroprene rubber and acryl rubber can be used as the sealing members.

The membrane electrode assembly 12 includes a solid polymer electrolyte membrane 120 in which water impregnates a thin film of perfluorosulfonic acid, and a cathode 122 and anode 124 sandwiching the solid polymer electrolyte member 120, for example.

The cathode 122 and anode 124 each include a gas diffusion layer composed of carbon paper, and a catalyst layer formed by coating porous carbon particles in which a platinum alloy is supported on the surface thereof onto the gas diffusion layer. Both of these electrodes are layered on the solid polymer electrolyte membrane 120 with the gas diffusion layer towards the outside, so that the catalyst layer touches the solid polymer electrolyte membrane 120.

As shown in FIGS. 2 and 3, an oxidant gas channel 142 that communicates with the oxidant gas inlet passage 22a and the oxidant gas outlet passage 22b is formed at the surface 140a of the first separator 14 opposing the membrane electrode assembly 12. A plurality of the oxidant gas channels 142 is provided to extend along the Y direction.

A fuel gas channel 162 communicating with the fuel gas inlet passage 26a and the fuel gas outlet passage 26b is formed at the surface 160a opposing the membrane electrode assembly 12 of the second separator 16. A plurality of the fuel gas channels 162 is provided to extend along the Y direction.

In addition, by the second separator 16 and first separator 14 overlapping to be integrated, a coolant channel 240 enclosed by the surface 140b on an opposite side from the surface 140a of the first separator 14, and the surface 160b on an opposite side from the surface 160a of the second separator 16 is formed. A plurality of the coolant channels 240 is provided to extend along the Y direction.

As shown in FIG. 3, the first separator 14 and the second separator 16 are metal separators for fuel cells of corrugated plate shape having concaved parts and convex parts. Herein, the convex parts of the metal separator for fuel cells of the present invention are configured by convex parts touching the membrane electrode assembly 12 and convex parts touching the convex parts of another adjacent separator.

It should be noted that this first separator 14 and second separator 16 are manufactured by the manufacturing method described later.

FIG. 4 is a cross-sectional view of a metal separator according to the present embodiment. More specifically, it is a cross-sectional view in the Z direction of a first separator 14 and second separator 16 that are adjacent to each other.

As shown in FIG. 4, the convex parts of the first separator 14 are configured from convex parts 145 touching the membrane electrode assembly 12 (more specifically, gas diffusion layer 122a of the cathode 122), and the convex part 143 projecting in a direction away from the gas diffusion layer 122a and touching the convex part 164 of the adjacent second separator 16 described later. A plurality of these convex parts 143 and 145 are arranged every predetermined interval in the Z direction.

In addition, the convex parts of the second separator 16 are configured from convex parts 165 touching the membrane electrode assembly 12 (more specifically, gas diffusion layer 124a of the cathode 124), and the convex part 164 projecting in a direction away from the gas diffusion layer 124a and touching the convex part 143 of an adjacent first separator 14. A plurality of these convex parts 164 and 165 are arranged every predetermined interval in the Z direction.

The first separator 14 and second separator 16 consist of the same configurations, the convex parts 145 of the first separator corresponding to the convex parts 165 of the second separator 16, and the convex parts 143 of the first separator 14 corresponding to the convex parts 164 of the second separator 16. Therefore, only the configuration of the first separator 14 will be explained in detail below.

As shown in FIG. 4, the first separator 14 has a plurality of convex parts 145 and convex parts 143 consecutively in the Z direction. The convex parts and concaved parts of the first separator 14, as described later, are formed by press molding; therefore, the convex parts 145 are configured from a flat portion 145a and R portions 145b and 145b at which the corner of both ends in the Z direction of the flat portion 145a form an R shape. In addition, the convex part 143 is also configured from a flat portion 143a and R portions 144b and 144b at which the corner of both ends in the Z direction of the flat portion 144a form an R shape.

As shown in FIG. 4, the oxidant gas channel 142 is formed by causing the convex parts 145 of the first separator 14 to abut the gas diffusion layer 122a of the cathode 122. At this time, although a predetermined contact pressure is applied to the electrode surface as mentioned above, since the gas diffusion layer 122a consisting of carbon paper has flexibility, a portion at the upper end of the convex parts 145 of the first separator 14 made of metal embeds inside of the gas diffusion layer 122a. For this reason, in addition to the flat portion 145a, the R portions 145b and 145b also touch the gas diffusion layer 122a.

Therefore, among the convex parts 145 of the first separator 14, a contact area 146 that is a portion touching the membrane electrode assembly 12 (more specifically, gas diffusion layer 122a of the cathode 122) is configured from the flat portion 145a and R portions 145b and 145b constituting the convex parts 145 of the first separator 14. In the present embodiment, a grid-shaped noble metal thin film 147 is formed over the entire surface of this contact area 146. More specifically, the noble metal thin film is formed only on the contact area 146 of the convex parts 145, and the noble metal thin film is not formed on the concaved parts.

On the other hand, the convex parts 143 of the first separator 14 abut the convex parts 164 of the second separator 16. The coolant channels 240 are formed by the convex parts 143 of the first separator abutting the convex parts 164 of the second separator 16. Since the first separator 14 and the second separator 16 are both metallic, they do not embed on another. Therefore, the flat portions 144a in the convex portions 143 of the first separator 14 abut the contact area with the convex parts 164 of the second separator 16. In the present embodiment, the grid-shaped noble metal thin film is also formed on the surface of this flat portion 144a. More specifically, the noble metal thin film is formed only on the flat portion 144a of the convex parts 143, and the noble metal thin film is not formed on the concaved parts.

A grid-shaped noble metal thin film formed on the surface of the flat portion 144a is a similar configuration to the grid-shaped noble metal thin film formed on the surface of the contact area 146; therefore, the noble metal thin film formed on the surface of the flat portion 144a yet in a grid shape will not be explained in detail.

Figure 5A:
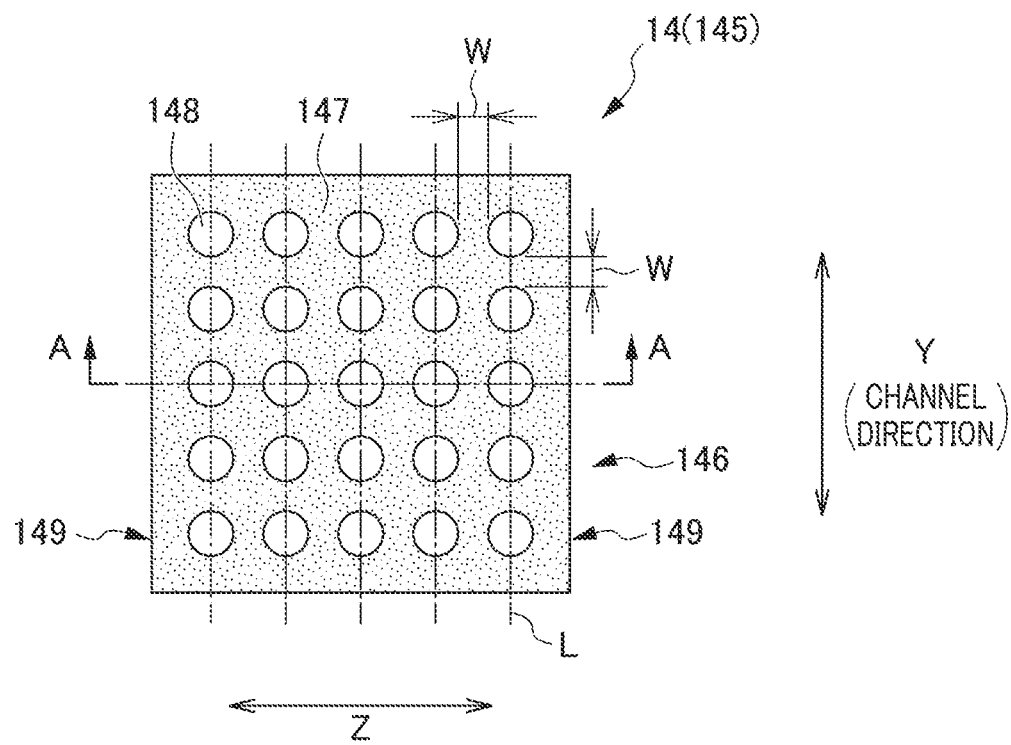
FIGS. 5A-5B are diagrams showing a noble metal thin film formed on the surface of the first separator according to the embodiment, with FIG. 5A being a plan view of convex parts of the first separator, and FIG. 5B being an end view along the line A-A in FIG. 5A.
Figure 5B:
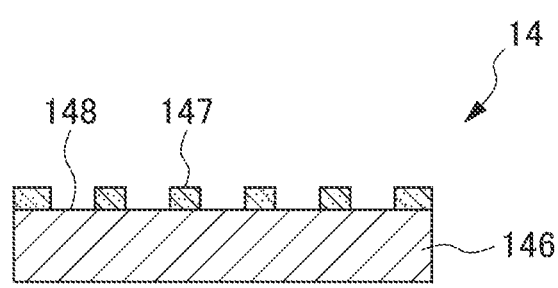

FIGS. 5A-5B are diagrams showing the noble metal thin film 147 formed on the surface of the first separator 14 according to the present embodiment, with FIG. 5A being a plan view of convex parts of the contact area 146 between the convex parts 145 of the first separator 14 and the membrane electrode assembly 12, and FIG. 5B being an end view along the line A-A in FIG. 5A.

As shown in FIG. 5A, the noble metal thin film 147 is formed in a grid shape on the contact area 146, i.e. portion of the convex parts 145 touching the membrane electrode assembly 12 (more specifically, gas diffusion layer 122a of the cathode 122). In addition, by the grid-shaped noble metal thin film 147 being formed, a plurality of holes 148, which is surrounded by the noble metal thin film 147 and through which the surface of the separator 14 is exposed, is formed in a grid shape. It should be noted that the holes 148 are not formed at both ends 149 and 149 in the Z direction of the contact area 146.

Herein, a shape in which the noble metal thin film 147 is formed in a grid and a plurality of holes 148 is formed in a grid indicates a shape in which the holes 148 are provided in the noble metal thin film 147, whereby the metal separator surface is exposed from the holes 148, and the holes 148 are arranged regularly. "Regularly" indicates that the center for the most part of the holes 148 are arranged at predetermined intervals on a plurality of virtual lines L as shown in FIG. 5A. It should be noted that a plurality of the virtual lines L may be formed in the convex part 145. By the holes 148 being regularly arranged in this way, it is possible to control the movement of reaction product water discharged. In other words, the reaction product water present in the center of the convex part 145 moves on the noble metal thin film on the virtual lines L from one to another, and can discharge in each adjacent channel. In contrast, in a case of the holes 147 being arranged irregularly, movement of reaction product water at a certain portion is inhibited, and the movement of reaction product water becomes uncontrollable.

In the present embodiment, the noble metal thin film 147 is formed in a grid on the surface of the contact area 146 so that the shape of the plurality of holes 148 is substantially circular in a plan view. The shape of the holes 148 may be a shape encircled by a smooth curve such as an ellipse. The grid spacing W of the noble metal thin film 147 formed in a grid shape is set to within the range of 50 to 200 μm. In addition, the diameter of the plurality of holes 148 is as set to within the range of 50 to 200 μm. By setting to within these ranges, the effects of the present embodiment described later are more reliably exhibited.

It should be noted that, in the present embodiment, the thickness of the solid polymer electrolyte membrane 120 is 20 μm to 50 μm; whereas, the thickness of the noble metal thin film 147 is 10 nm to 100 nm. In addition, the area ratio of the noble metal thin film 147 on the contact area 146 of the convex parts 145 is 40 to 80%, and preferably 55 to 65%.

As the noble metal constituting the noble metal thin film 147, for example, gold, silver, rhodium, platinum, an alloy with these as main components, or the like can be used. In the present embodiment, gold is used as the noble metal, whereby a grid-shaped gold thin film is formed on the surface of the contact area 146.

It should be noted that the noble metal thin film 147 has a characteristic of not easily generating oxides and having water repellency; therefore, by forming the noble metal thin film 147 on the contact area 146, an increase in the contact resistance between the first separator 14 and the membrane electrode assembly 12 is suppressed, and a decline in the terminal voltage is suppressed.

The fuel cell stack 1 according to the present embodiment providing the above configuration operates in the following way. Referring back to FIG. 2, first, oxidant gas is supplied to the fuel cell stack 1 by an oxidant gas supply device that is not illustrated. Then, the supplied oxidant gas flows in from the oxidant gas inlet passage 22a, and flows through the oxidant gas channel 142 formed between the solid polymer electrolyte membrane 120 and the first separator 14. Oxidant gas is thereby supplied to the cathode 122.

Furthermore, at this time, fuel gas is supplied to the fuel cell stack 1 by a fuel gas supply device that is not illustrated. Then, the supplied fuel gas flows in from the fuel gas inlet passage 26a, and flows through the fuel gas channel 162 formed between the solid polymer electrolyte membrane 120 and the second separator 16. Fuel gas is thereby supplied to the anode 124.

Furthermore, at this time, coolant is supplied to the fuel cell stack 1 by a coolant supply device that is not illustrated. Then, the supplied coolant flows in from the coolant inlet passage 24a, and flows through the coolant channel 240 formed between the first separator 14 and the second separator 16.

Electric power generation is performed in the membrane electrode assembly 12 by the electrochemical reaction progressing between the oxidant gas supplied to the cathode 122 and the fuel gas supplied to the anode 124. The membrane electrode assembly 12 heated by the generation of heat from electric power generation is cooled by the coolant flowing through the coolant channel 240.

In addition, upon electric power generation, water is produced on the cathode side accompanying the electrochemical reaction, and moves to the anode side through the solid polymer electrolyte membrane 120. In addition to being exhausted by flowing through the respective gas channels, this reaction product water flows into the interface of the contact area 146 between the convex parts 145 of the respective separators and the membrane electrode assembly 12. At this time, the reaction product water having flowed into the interface of the contact area 146 flows smoothly over the noble metal thin film 147 of grid shape formed on the contact area 146 of the respective separators, pours into the holes 148 and is maintained inside of the holes 148.

Subsequently, the oxidant gas supplied to the cathode 122 and consumed is discharged from the oxidant gas outlet passage 22b, and the fuel gas supplied to the anode 124 and consumed is discharged from the fuel gas outlet passage 26b. In addition, the coolant used in cooling of the membrane electrode assembly 12 is discharged from the coolant outlet passage 24b.

Next, a method of manufacturing a metal separator for fuel cells according to an embodiment of the present invention will be explained. The method of manufacturing a metal separator for fuel cells according to the present embodiment includes a molding step and noble metal thin film formation step.

In the molding step, a thin sheet made of metal is molded in a corrugated sheet shape by press molding. More specifically, a thin sheet made of metal is molded into a corrugated sheet shape having convexities and concavities by drawing using a conventional, known press molding apparatus. As the thin sheet made of metal, a steel sheet, stainless steel sheet, aluminum sheet or the like can be used, for example.

In the noble metal thin film formation step, among the convex parts of the thin sheet made of metal formed into a corrugated sheet shape having convexities and concavities, a noble metal thin film is formed on a surface of a contact area that contacts the membrane electrode assembly when layered on the membrane electrode assembly. In more detail, the noble metal thin film is formed so that holes through which the first separator is exposed are formed in the noble metal thin film. In the present embodiment, as the method of forming the noble metal thin film, an ink-jet printing method is adopted.

FIG. 6 is a view showing the noble metal thin film formation step according to the ink-jet printing method. As shown in FIG. 6, an ink-jet device 5 used in the ink-jet printing method includes: an ink container 52 in which ink 50 is accommodated, an ink supply line 54 for supplying the ink 50, and an ink jet pad 56 provided with a plurality of spray nozzles (not illustrated) that spray the ink 50 supplied by the ink supply line 54 towards the contact area 146 of the first separator 14.

As the ink 50, an ink made by dispersing noble metal particles into an organic solvent with the action of a dispersant can be used. As the dispersant, a dispersant having a hydrophilic group and hydrophobic group is used, the hydrophilic group coordinating to the surface of the noble metal particles, and the noble metal particles are stably dispersed in the organic solvent by solvating by way of the hydrophobic group.

For example, gold particles, silver particles, rhodium particles, platinum particles and the like can be used as the noble metal particles, and in the present embodiment, gold particles are used as the noble metal particles. It should be noted that the particle size of the noble metal particles is set to no more than several tens of nanometers.

A plurality of spray nozzles included in the ink jet pad 56 is provided at the same interval as the interval between the plurality of adjacent contact areas 146. Since a plurality of spray nozzles are provided to the ink jet pad 56, it is possible to simultaneously create a regular pattern on the plurality of contact areas 146 of the convex parts 145. In other words, with these spray nozzles, it has become possible to draw on the contact areas 146 a grid pattern using the ink 50.

Upon executing ink-jet printing, the first separator 14 is conveyed by a conveyor mechanism that is not illustrated, while scanning the ink jet pad 56 by way of a scanning mechanism that is not illustrated, as necessary depending on the relationship between the width of the ink jet pad 56 and the drawing width. A grid pattern is thereby drawn with the ink 50 on the entirety of the contact area 146 of the first separator 14.

After drawing the grid pattern with the ink 50 on the contact areas 146 using the ink jet device 5, heat treatment is conducted using a heating device that is not illustrated. The heat treatment conditions are set depending on the type of ink used and, for example, heat treatment is conducted at 300° C. for 30 minutes. Then, the organic components in the ink 50 (dispersant and organic solvent) are oxidatively decomposed and removed, and the remaining noble metal particles sinter to become integrated, whereby the noble metal thin film is formed. At this time, the grid pattern is maintained by the ink 50, and the grid-shaped noble metal thin film is formed.

It should be noted that, prior to forming the noble metal thin film by the ink-jet printing method, a conventional, known washing process is conducted. For example, after conducting alkali washing as a degreasing process on the thin sheet made of metal after the molding step, a plasma wash and UV ozone wash are conducted thereon, and then it is subjected to the noble metal thin film formation step. Formation of a noble metal thin film having favorable adherence with the metal separator for fuel cells thereby becomes possible.

The following effects are exerted according to the present embodiment.

In the present embodiment, the first separator 14 made of metal is formed into a corrugated sheet shape having convexities and concavities, and the noble metal thin film 147 is formed on the surface of the convex parts 145 thereof. In addition, in the present embodiment, the holes 148 through which the first separator 14 is exposed are formed in the noble metal thin film 147.

Herein, the noble metal thin film 147 has a characteristic of not easily generating oxides, and having water-repellency. On the other hand, the holes 148 have a characteristic of oxides tending to be produced on the surface of the first separator 14 and having hydrophilicity. For this reason, the reaction product water produced by the reaction at the membrane electrode assembly 12 and flowing into the interface with the first separator 14 smoothly pours into the holes 148 and is maintained therein. The wet environment of the membrane electrode assembly 12 can thereby be equalized since the reaction product water is uniformly maintained at the interface between the membrane electrode assembly 12 and the first separator 14 without distributing unevenly.

In addition, during high-load operation, for example, since an abundance of reaction product water is generated, the reaction product water amount pouring into the holes 148 exceeds the capacity of the holes 148. Then, the reaction product water starts to overflow from the holes 148 and smoothly flows over the water-repellent noble metal thin film 147, and flows out to the respective adjacent channels. Even during high-load operation, the reaction product water does not unevenly distribute at the interface between the membrane electrode assembly 12 and the first separator 14, whereby the equalized wet environment of the membrane electrode assembly 12 is maintained.

In contrast, during low-load operation, for example, since only a small amount of reaction product water is produced, the reaction product water being retained in the holes 148 during high-load operation is supplied to the membrane electrode assembly 12 side. A change in the wet environment of the membrane electrode assembly 12 is thereby suppressed even during low-load operation, and thus the equalized wet environment is maintained.

Therefore, according to the present embodiment, the wet environment of the membrane electrode assembly 12 can be equalized irrespective of the operation state of the fuel cell.

Furthermore, contact resistance between the first separator 14 and the second separator 16 can be suppressed by the noble metal thin film formed with holes exposing the first separator 14 made of metal being formed on a surface of the contact area (flat portions 144a) of the convex parts of the first separator 14 made of metal contacting with the convex parts of the second separator 16 made of metal.

It should be noted that, in a case of an inverse lattice pattern in which the positions of the noble metal thin film 147 and the holes 148 are reversed, i.e. in a case of the noble metal thin film 147 being arranged regularly in island shapes at the contact area 146 of the convex parts 145 of the first separator 14, the wet environment of the membrane electrode assembly 12 cannot be equalized because the flow direction of the reaction product water flowing into the interface between the membrane electrode assembly 12 and the first separator 14 cannot be controlled, and thus the reaction product water distributes unevenly at the interface.

In addition, in the present embodiment, the holes 148 are formed regularly in the surface of the contact area 146. The wet environment of the membrane electrode assembly 12 can thereby be further equalized since the reaction product water is more uniformly retained without unevenly distributing at the interface between the membrane electrode assembly 12 and the first separator 14. In addition, the wet environment of the membrane electrode assembly 12 can be further equalized irrespective of the operation state of the fuel cell.

In addition, the same effects as the aforementioned effects are exerted according to the method of manufacturing a metal separator for fuel cells according to the present embodiment. In particular, by adopting an ink-jet printing method, it is possible to manufacture a metal separator for fuel cells in which a grid-shaped noble metal thin film is formed on a surface by way of a low cost, simple operation.

In more detail, in a plating process, for example, masking is required in order to form a grid-shaped noble metal thin film, and further, after the plating process, a polishing process and washing and drying processes for chemical removal are required, and thus the operation is complicated and becomes high cost. In contrast, in ink-jet printing, since the grid-shaped noble metal thin film 147 can be formed at the desired positions without masking, it is sufficient to simply perform heat treatment after printing, whereby the operation is simplified and cost can be reduced. Furthermore, as a characteristic of ink-jet printing, it is possible to form a thinner and uniform noble metal thin film 147 without surface irregularity; therefore, the aforementioned effects are obtained while suppressing the amount of high-cost noble metal used.

It should be noted that the present invention is not to be limited to the above-mentioned embodiments, and that modifications, improvements and the like within a scope that can achieve the object of the present invention are included in the present invention.

Figure 7:
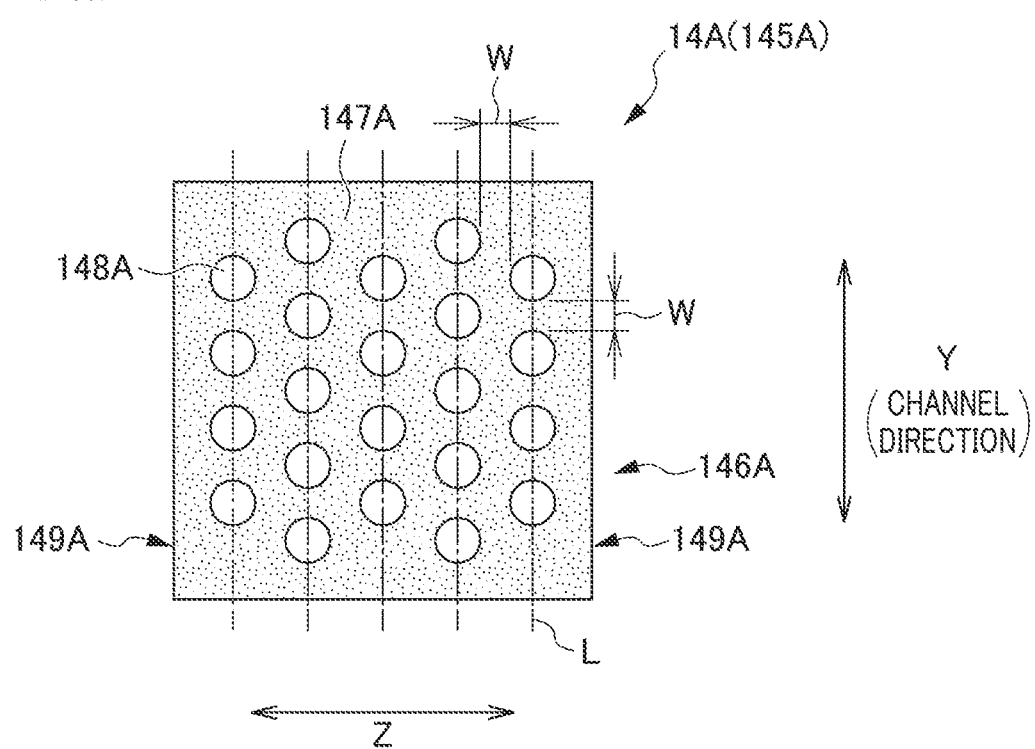
FIG. 7 is a plan view of convex parts of the first separator according to a modified example of the embodiment.

In the above-mentioned embodiment, the holes 148 as shown in FIG. 5A are arranged at predetermined intervals on a plurality of virtual straight lines L, and all of the adjacent holes 148 in the Z direction are arranged on the same straight line; however, it is not limited thereto. For example, FIG. 7 is a plan view of a contact area 146A between convex parts 145A of a first separator 14A and the membrane electrode assembly according to a modified example of the above-mentioned embodiment; however, as shown in FIG. 7, holes 148A may be arranged at predetermined intervals on a plurality of virtual straight lines L, and the adjacent holes 148A may be arranged staggering by a predetermined interval in the Z direction.

Figure 8:
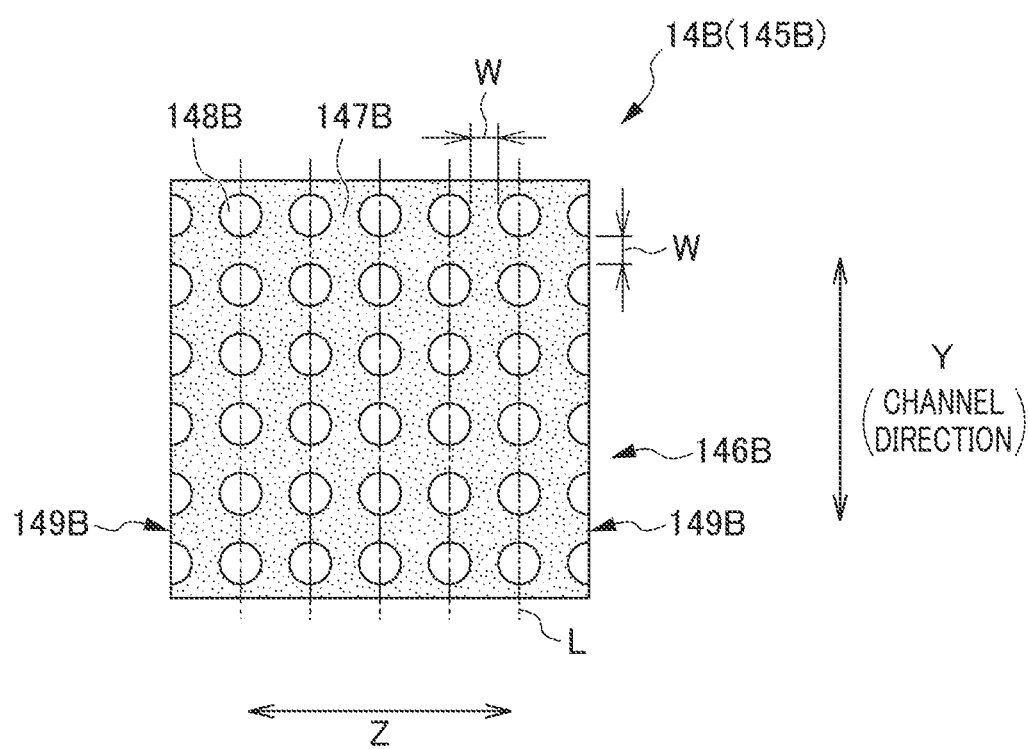
FIG. 8 is a plan view of convex parts of the first separator according to a modified example of the embodiment.

In addition, FIG. 8 also is a plan view of a contact area 146B between convex parts 145B of a first separator 14B and the membrane electrode assembly according to a modified example of the above-mentioned embodiment; however, as shown in FIG. 8, holes 148B may be formed in both ends 149B, 149B in the Z direction of the contact area 146B. According to this modified example, at both ends 149B, 149B in the Z direction adjacent to the respective channels, a portion at which a noble metal thin film 147B is formed and a portion in which the holes 148B are formed are present, and thus portions having different functions are present. It is thereby possible to smoothly introduce reaction gas by repelling reaction product water at the portion on which the noble metal thin film 147B is formed. In addition, at the portion in which the holes 148B are formed, since oxides are produced at the surface of the metal separator, the reaction product water is introduced (drawn) and can be efficiently discharged to the respective adjacent channels.

It should be noted that the holes 148B may be provided over a region from a flat portion 145a to an R portion 145b, or may be provided only in the R portion 145b.

In addition, although the noble metal thin film 147 is formed so that the shape of the plurality of holes 148 is substantially circular in a plan view in the above-mentioned embodiment, for example, the noble metal thin film may be formed so that the shape of the plurality of holes is substantially triangular or substantially square. Modified examples of the above-mentioned embodiment in which the noble metal thin film is formed so that the shape of the plurality of holes is a substantially triangular shape or substantially square shape are shown in FIGS. 9 to 12. As shown in FIGS. 9 to 12, it is possible to make the shape of holes into a substantially triangular shape or substantially square shape by connecting the ink of a plurality of dots containing noble metal.

Figure 9:
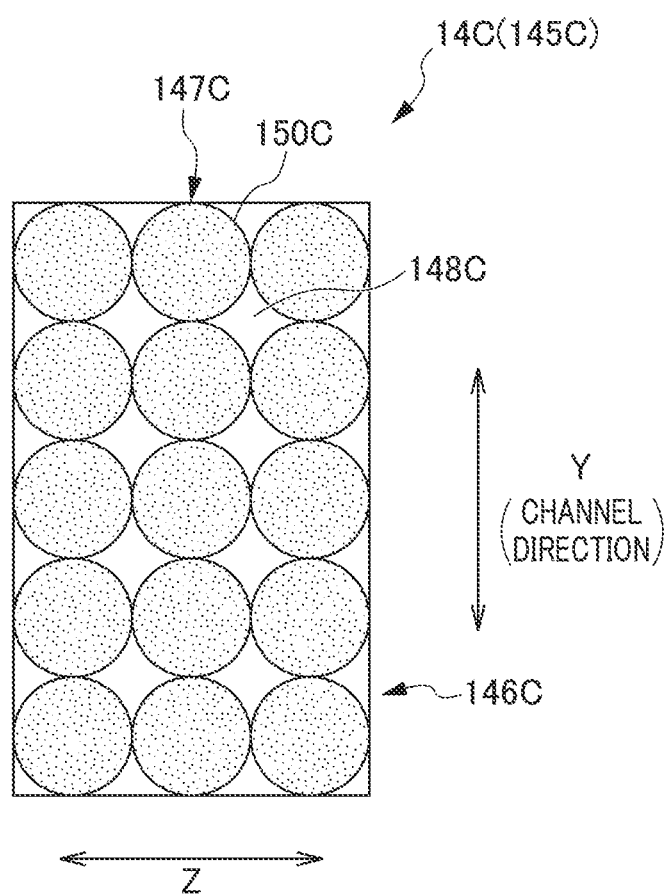
FIG. 9 is a plan view showing a dot-shaped ink pattern of convex parts of the first separator according to a modified example of the embodiment.

For example, FIG. 9 is a plan view showing an ink pattern of dots containing noble metal at a contact area 146C between convex parts 145C of a first separator 14C and the membrane electrode assembly according to a modified example of the above-mentioned embodiment. As shown in FIG. 9, the noble metal thin film 147C is formed by a plurality of circle-shaped dots 150C. The plurality of circle-shaped dots 150C are regularly arranged in the Y direction and Z direction, and adjoining dots 150C are touching. The holes 148C are formed by being surrounded by four of the dots 150C. The holes 148C are substantially square shape, and are regularly arranged in the Y direction and Z direction similarly to the dots 150C.

Figure 10A:
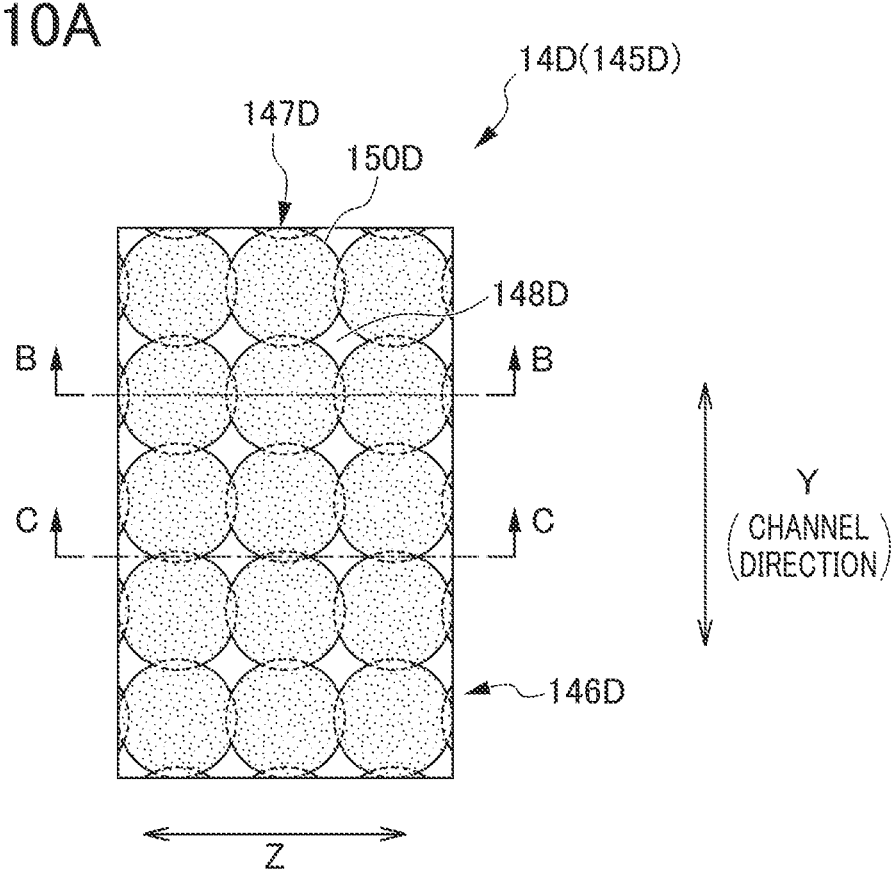
FIGS. 10A-10C are diagrams showing a dot-shaped ink pattern of convex parts of the first separator according to a modified example of the embodiment, with FIG. 10A being a plan view, FIG. 10B being an end view along the line B-B in FIG. 10A, and FIG. 10C being an end view along the line C-C in FIG. 10A.
Figure 10B:
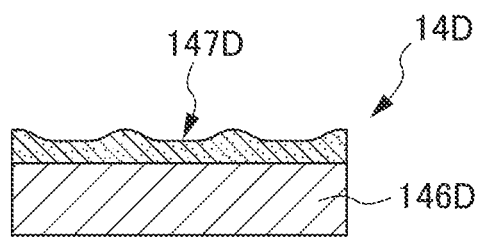
Figure 10C:
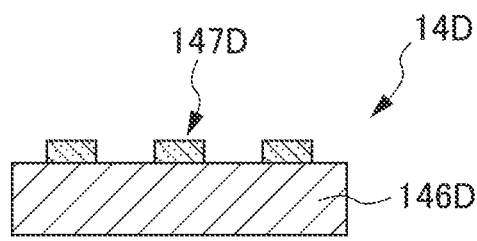

In addition, FIGS. 10A-10C are views showing an ink pattern of dots containing noble metal at a contact area 146D between convex parts 145D of a first separator 14D and the membrane electrode assembly according to a modified example of the above-mentioned embodiment, with FIG. 10A being a plan view, FIG. 10B being an end view along the line B-B in FIG. 10A, and FIG. 10C being an end view along the line C-C in FIG. 10A. As shown in FIG. 10A, the noble metal thin film 147D is formed by a plurality of circle-shaped dots 150D. The plurality of circle-shaped dots 150D is regularly arranged in the Y direction and Z direction similarly to the pattern shown in FIG. 9; however, adjoining dots 150D in the Y direction and Z direction are partially overlapping. The shape and size of the regions in which the adjoining dots 150D are overlapping are all the same. The holes 148D are formed by being surrounded by four of the dots 150D. The holes 148D are substantially square shape, and are regularly arranged in the Y direction and Z direction similarly to the dots.

In addition, as shown in FIGS. 10B and 10C, at the locations at which adjoining dots 150D are overlapping, the film thickness of the noble metal thin film 147D becomes thicker than at locations not overlapping. This location having thick film thickness acts as a guide wall to lead the reaction product water to the holes 148D. The reaction product water is thereby effectively led to and retained in the holes 148D.

Figure 11:
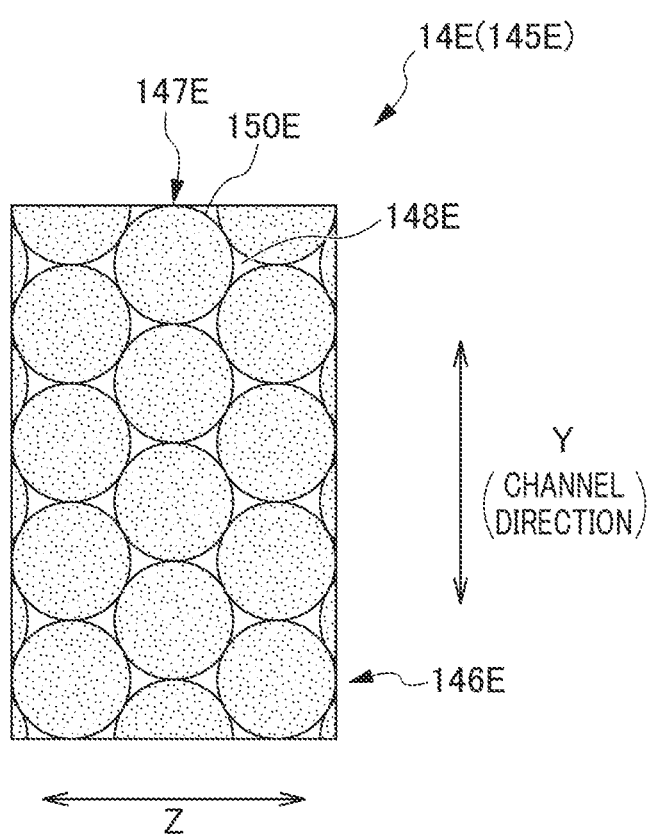
FIG. 11 is a plan view showing a dot-shaped ink pattern of convex parts of the first separator according to a modified example of the embodiment.

In addition, FIG. 11 is also a plan view showing an ink pattern of dots containing noble metal at a contact area 146E between convex parts 145E of a first separator 14E and the membrane electrode assembly according to a modified example of the above-mentioned embodiment. As shown in FIG. 11, the noble metal thin film 147E is formed by a plurality of circle-shaped dots 150E. The plurality of circle-shaped dots 150E are regularly arranged in the Y direction, and adjoining dots 150E in the Z direction are arranged shifted by radius thereof in the Y direction, and adjoining dots 150E are touching. In other words, the ink pattern of dots containing noble metal shown in FIG. 11 is a pattern in which the dots 150E are closely packed on the plane surface. The holes 148E are each formed by being surrounded by three of the dots 150E. The holes 148E are substantially triangular shape, and are regularly arranged in the Y direction and Z direction.

Figure 12:
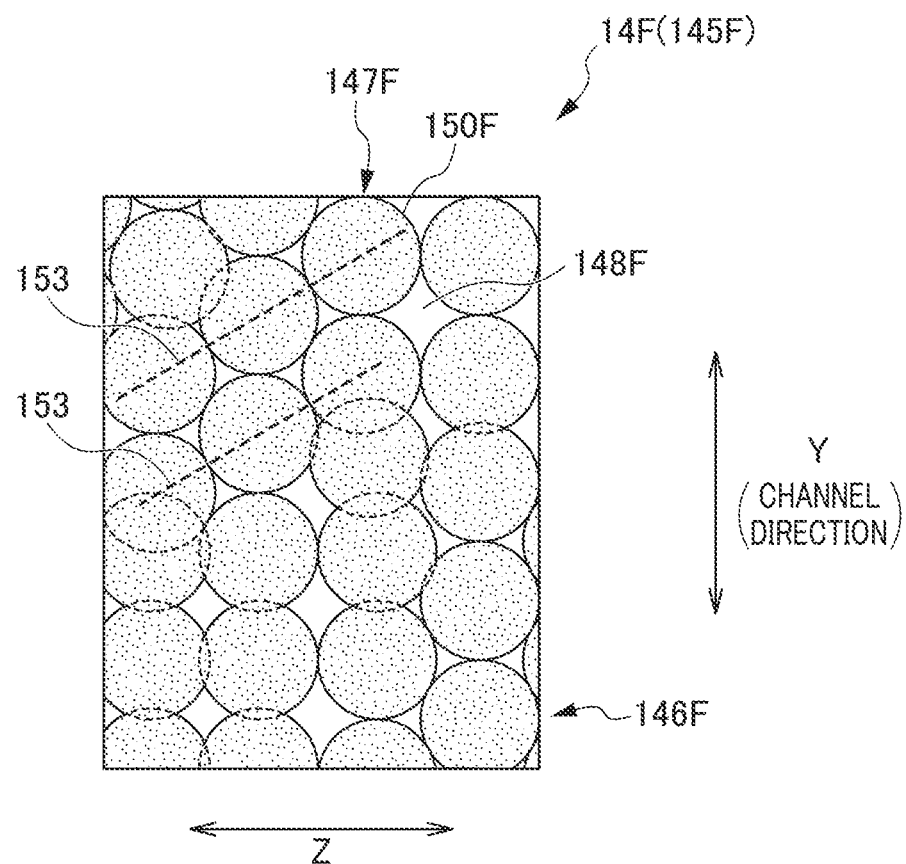
FIG. 12 is a plan view showing a dot-shaped ink pattern of convex parts of the first separator according a modified example of the embodiment.

In addition, FIG. 12 is also a plan view showing an ink pattern of dots containing noble metal at a contact area 146F between convex parts 145F of a first separator 14F and the membrane electrode assembly according to a modified example of the above-mentioned embodiment. As shown in FIG. 12, a noble metal thin film 147F is formed by a plurality of circle-shaped dots 150F. A portion (dots 150F arranged on additional lines 153, 153) of the plurality of circle-shaped dots 150F is regularly arranged, and others are irregularly disposed, and thus there are some locations at which adjoining dots 150F are touching, and there are some overlapping locations. Although the holes 148F are formed by being surrounded by dots 150F, holes 148F of various shapes and sizes are present. In addition, since a portion of the plurality of circle-shaped dots 150F are regularly arranged, a portion of the plurality of holes 148F formed are also regularly arranged. A substantially square shape similar to the patterns shown in FIGS. 9 and 10A-10C, a substantially triangular shape similar to the pattern shown in FIG. 11, and a distorted substantially rectangular shape as shown in FIG. 12, or the like can be exemplified as the shape of the holes 148F.

It should be noted that the overlapping locations have a film thickness of the noble metal thin film 147F that becomes thick as mentioned above, and acts as a guide wall leading the reaction product water to the holes 148F, whereby the reaction product water is effectively led and retained in the holes 148F.

In the modified examples of the above-mentioned embodiment shown in FIGS. 9 to 12, the holes are formed by surrounding with the noble metal thin film formed by dot-shaped ink containing noble metal connecting. It is thereby possible to easily obtain a metal separator for fuel cells on which a grid-shaped noble metal thin film is formed on the surface.

Figure 13A:
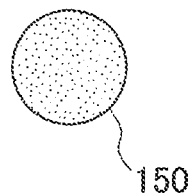
FIG. 13A is a plan view showing the circular form of dot-shaped ink containing noble metal according to a modified example of the embodiment.
Figure 13B:
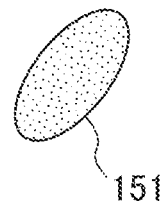
FIG. 13B is a plan view showing the elliptical form of dot-shaped ink containing noble metal according to another modified example of the embodiment.
Figure 13C:
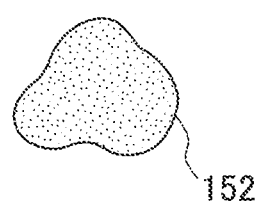
FIG. 13C is a plan view showing the distorted circular form of dot-shaped ink containing noble metal according to another modified example of the embodiment.

In the modified examples of the above-mentioned embodiment shown in FIGS. 9 to 12, although patterns in which the dot-shaped ink containing noble metal is the circular dot 150 as shown in FIG. 13A, the shape of the dot-shaped ink containing noble metal is not limited thereto. For example, the dot-shaped ink containing noble metal may be the elliptical dot 151 as shown in FIG. 13B, or may be the distorted circular dot 152 as shown in FIG. 13C.

What is claimed is:

1. A metal separator for fuel cells that is layered on a membrane electrode assembly to which a pair of electrodes is provided on both sides of an electrolyte membrane,
    wherein the metal separator for fuel cells is formed in a corrugated sheet shape having convex parts and concave parts,
    wherein a noble metal thin film is formed as an interconnected grid on each convex part on each of the convex parts of the metal separator for fuel cells, and
    wherein holes through which the metal separator for fuel cells is exposed are formed in the noble metal thin film.

2. The metal separator for fuel cells according to claim 1, wherein the holes are regularly formed in the surface of the convex part.

3. The metal separator for fuel cells according to claim 1, wherein the holes are formed by being surrounded with the noble metal thin film formed by dot-shaped ink containing noble metal connecting with each other.

4. The metal separator for fuel cells according to claim 2, wherein the holes are formed by being surrounded with the noble metal thin film formed by dot-shaped ink containing noble metal connecting with each other.

5. A method of manufacturing a metal separator for fuel cells layered on a membrane electrode assembly to which a pair of electrodes is provided, with a respective one of said electrodes provided on each of two sides of an electrolyte membrane, the method comprising:
    a noble metal thin film formation step of forming a noble metal thin film on a convex part of a thin sheet made of a primary metal that has been formed into a corrugated sheet shape having convex parts and concave parts,
    wherein the noble metal thin film is formed as an interconnected grid on each convex part in the noble metal thin film formation step, and is formed in a manner so that holes, through which the primary metal of the metal separator for fuel cells is exposed, are formed on each convex part in the grid of the noble metal thin film.

6. The method of manufacturing a metal separator for fuel cells according to claim 5, wherein the noble metal thin film is formed in the noble metal thin film formation step by way of applying an ink containing a noble metal using an ink-jet printing method.

7. The method of manufacturing a metal separator for fuel cells according to claim 6, wherein the ink-jet printing method comprises spraying the ink on to the thin sheet using a plurality of spray nozzles.

8. The method of manufacturing a metal separator for fuel cells according to claim 5, wherein the ink comprises an organic solvent, a dispersant, and the noble metal.

9. The method of manufacturing a metal separator for fuel cells according to claim 8, wherein gold particles are used as the noble metal particles of the ink, and wherein a particle size of the noble metal particles is in a range of 20-40 nanometers.

10. The method of manufacturing a metal separator for fuel cells according to claim 5, wherein the noble metal thin film formation step comprises sub-steps of applying the noble metal thin film to the thin sheet, and heating the metal separator after the thin film has been applied in a manner so that noble metal particles of the thin film sinter to become integrated, whereby the noble metal thin film is formed.

11. The method of manufacturing a metal separator for fuel cells according to claim 5, wherein the holes have a diameter in a range of 50-200 micrometers.

12. A metal separator for fuel cells, which is a product of the method of claim 5.

13. A metal separator for fuel cells, which is a product of the method of claim 6.

14. A method of manufacturing a metal separator for fuel cells layered on a membrane electrode assembly to which a pair of electrodes is provided on both sides of an electrolyte membrane, the method comprising steps of:

forming a base metal sheet into a metal separator in a corrugated shape, the metal separator having convex parts and concave parts, the convex parts having a contact area that is configured to contact the membrane electrode assembly or a second metal separator;

applying an ink containing a noble metal exclusively to areas of selected convex parts on a surface of the base metal sheet using an ink-jet printing method to define an uncured film; and heating the metal separator after the thin film has been applied in a manner so that noble metal particles of the thin film sinter to become integrated, thereby forming a noble metal thin film on each convex part on the contact area of the metal separator, wherein the noble metal thin film of each convex part is formed as an interconnected grid, and is formed in a manner so that holes through which the base metal sheet is exposed.

15. The method of manufacturing a metal separator for fuel cells according to claim 14, wherein the noble metal thin film is formed in the noble metal thin film formation step by way of an ink-jet printing method.

16. The method of manufacturing a metal separator for fuel cells according to claim 14, wherein the noble metal thin film applied as an ink containing a noble metal using an ink-jet printing method.

17. The method of manufacturing a metal separator for fuel cells according to claim 16, wherein the ink-jet printing method comprises spraying the ink on to the thin sheet using a plurality of spray nozzles.

18. The method of manufacturing a metal separator for fuel cells according to claim 14, wherein the ink comprises an organic solvent, a dispersant, and the noble metal.

19. The method of manufacturing a metal separator for fuel cells according to claim 18, wherein gold particles are used as the noble metal particles of the ink, and wherein a particle size of the noble metal particles is in a range of 20-40 nanometers.

20. A metal separator for fuel cells, which is a product of the method of claim 14.

* * * * *